United States Patent [19]

Soma et al.

[11] Patent Number: 4,722,915
[45] Date of Patent: Feb. 2, 1988

[54] ZIRCONIA PORCELAIN

[75] Inventors: Takao Soma; Minoru Matsui, both of Nagoya, Japan

[73] Assignee: NGK Insulators, Ltd., Japan

[21] Appl. No.: 936,929

[22] Filed: Nov. 28, 1986

Related U.S. Application Data

[63] Continuation of Ser. No. 782,396, Oct. 1, 1985, abandoned.

[30] Foreign Application Priority Data

Oct. 24, 1984 [JP]  Japan ................. 59-222218

[51] Int. Cl.$^4$ ............................................. C04B 35/48
[52] U.S. Cl. .................................................... 501/103
[58] Field of Search ................ 501/102, 103, 104, 105

[56] References Cited

FOREIGN PATENT DOCUMENTS

| 0036786 | 9/1981  | European Pat. Off. . |
| 0096519 | 12/1983 | European Pat. Off. . |
| 2231539 | 1/1973  | Fed. Rep. of Germany . |
| 2307666 | 6/1979  | Fed. Rep. of Germany . |
| 3035072 | 3/1981  | Fed. Rep. of Germany . |

Primary Examiner—Mark L. Bell
Attorney, Agent, or Firm—Parkhurst & Oliff

[57] ABSTRACT

Disclosed herein is a high durability zirconia porcelain which is high in thermal stability and free from degradation phenomena such as profile change and strength reduction, and is characterized in that change in length after the zirconia porcelain being maintained in hot water at 250° C. for 50 hours is not more than 0.05%.

13 Claims, 2 Drawing Figures

ZIRCONIA PORCELAIN

This is a continuation of application Ser. No. 782,396 filed Oct. 1, 1985, now abandoned.

BACKGROUND OF THE INVENTION

(1) Field of the Invention

The present invention relates to ceramics containing tetragonal zirconia.

(2) Related Art Statement

Ceramics containing tetragonal zirconia have been heretofore widely studied as a high temperature structural material, a material for use in cutting tools, oxygen sensors and so on, since such ceramics have thermal resistance, high strength and high toughness, in addition to ion conductivity at high temperatures.

While zirconia is stable at high temperatures as the high density tetragonal system, it is stable at low temperatures as the low density monoclinic system. Therefore, zirconia undergoes phase transformation when the temperature varies, resulting in large volumetric changes.

(PROBLEMS TO BE SOLVED BY THE INVENTION)

Since firing is ordinarily carried out at high temperatures to produce ceramics containing zirconia, the resulting crystal phase of zirconia is tetragonal and the tetragonal zirconia is transformed to monoclinic zirconia at low temperatures during the cooling step. This phase transformation results in cracks in the zirconia body, thereby reducing its strength. To produce crack-free ceramics containing high strength zirconia in which the tetragonal zirconia stable at high temperatures remains as a metastable phase at low temperatures, without being transformed into the monoclinic phase, it is known that by adding a stabilizer such as yttria, calcia, magnesia, etc. to zirconia or by controlling the microstructure of the ceramics, the undesirable volumetric changes due to phase transformation can be ameliorated. Conventional zirconia-containing ceramics typically do not undergo transformation from the tetragonal system to the monoclinic system over short periods of time, but there appears to be a degradation phenomena that when such zirconia ceramics are used for a long period of time, they are gradually transformed from the tetragonal phase to the monoclinic phase, resulting in a change in shape and a decrease in strength. Therefore, such zirconia-containing ceramics have the drawback that they have poor reliability as high temperature structural materials, for instance, components of parts such as engine parts, which are required to be durable for as long as several thousand hours.

SUMMARY OF THE INVENTION

It is therefore an object of the present invention to provide a high durability zirconia ceramic which has a high thermal stability, and is free from the degradation phenomena which results in profile changes (i.e. shape changes) and strength reduction, especially when the zirconia ceramic is used for an extended period of time.

According to the present invention, the tetragonal zirconia-containing zirconia porcelain is characterized in that the change in length after the zirconia procelain is maintained in hot water at 250° C. for 50 hours is not more than 0.05%.

According to the preferred embodiments of the invention, the change in length is not more than 0.02%; the content of the tetragonal zirconia is not less than 5% by volume, preferably not less than 50% by volume; a stabilizer of the zirconia is yttria; the content of yttria is in an amount of from 2 to 10% by weight; and the strength of the zirconia porcelain is not less than 500 MPa.

These and further objects, features and advantages of the invention will be well appreciated upon reading of the following description of the invention when taken in conjunction with the attached drawings with understanding that some modifications, variations and changes of the same could be easily made by those skilled in the art to which the invention pertains, without departing from the spirit of the invention or the scope of claims appended hereto.

BRIEF DESCRIPTION OF THE ATTACHED DRAWINGS

For better understanding of the invention, reference is made to the drawings, wherein:

FIG. 1 is a graph showing the relationship between the volume percentage of tetragonal zirconia grains with non-uniform composition and change in length of the samples after hot water treatment in an autoclave at 250° C. for 50 hours; and FIG. 2 is a graph showing the relationship between the length change after hot water treatment in an autoclave at 250° C. for 50 hours and the length change after treatment in air at 250° C. for 5,000 hours.

DETAILED DESCRIPTION OF THE INVENTION

When ceramics containing unstabilized zirconia are sintered at high temperatures, a sintered body containing tetragonal zirconia is obtained. While the sintered body is being cooled, the tetragonal system transforms into the monoclinic system at a temperature lower than the thermodynamic equilibrium temperature between them, resulting in a change in the profile (i.e., shape) of the sintered body and degradation of characteristics such as strength, electric properties and so on. To control the resistance against the degradation of ceramics containing tetragonal zirconia due to the transformation from the tetragonal system to the monoclinic system, there have been heretofore known different types and amounts of stabilizer solid solved into the zirconia, different sizes and amounts of crystal grains of tetragonal zirconia, and the variations in holding temperature and time. That is, the stabilizer includes yttria and the like, which stabilize the zirconia by the addition of only a small amount, as well as magnesia and, ceria which do not stabilize the zirconia unless they are added in relatively large amounts. Further, it is known that the smaller the crystal grains of tetragonal zirconia, the smaller the degradation, while the smaller the amount of the crystals of tetragonal zirconia, the lower the strength but the more difficult the degradation. The degradation rate is dependent upon the temperature, and occurs very rapidly at from 200° C. to 300° C. The longer the holding time (i.e. exposure to constant temperature), the larger the amount of degradation. In addition, the present inventors have recently made clear that the larger the content of water in the atmosphere, the more that the degradation of the zirconia body is accelerated (See Japanese Patent Application No.

107,645/1983 "Ceramics testing method" U.S. Pat. No. 4,559,824).

Through detailed studies of the long time lasting durability of the zirconia porcelain through utilizing the accelerated degradation effect upon the zirconia porcelain due to this water, the present invention is based on the discovery that the porosity of the sintered body and the dispersibility of the stabilizer in the ceramics containing the tetragonal zirconia in addition to the above factors play extremely important roles in the resistance of the zirconia porcelain against degradation.

Figure 1:
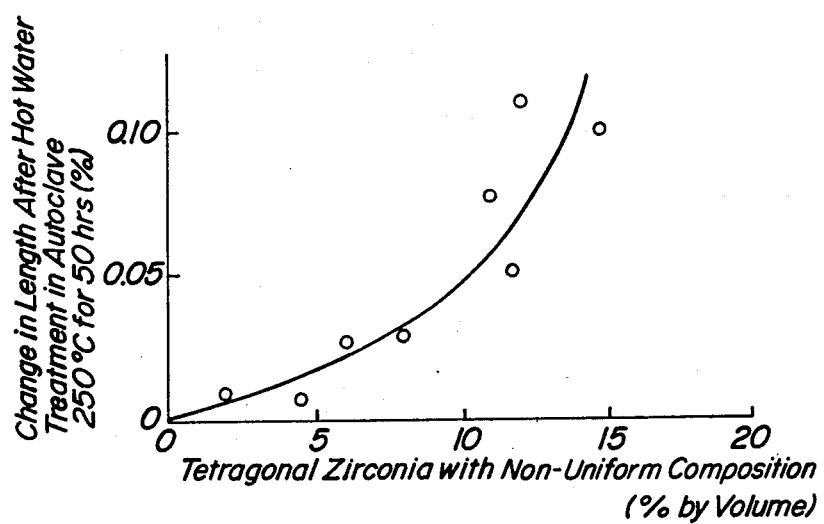

When the porosity of the zirconia porcelain is low and the restraint force upon the tetragonal grains from the surrounding environment is large, any phase transformation accompanied by a large volume change is restricted. Further, when the stabilizer is not uniformly dispersed among the zirconia particles, some tetragonal zirconia is not contacted with the stabilizer and the transformation is likely to be developed in this unmixed portion. Due to the volume change following the transformation from tetragonal to monoclinic large strain is transferred to the surrounding tetragonal zirconia, resulting in inducement of the transformation and degradation of the whole zirconia body through a successive chain reaction. By way of an example, with respect to various zirconia porcelains which have been prepared from 8.2% by weight of yttria powder and 91.8% by weight of zirconia powder by varying blending conditions and having various contents of non-uniform compositions of tetragonal zirconia grains with the particle size of about 2.3 $\mu$m of the tetragonal zirconia and the porosity of about 3%, FIG. 1 shows the relationship between the volume percentage of the non-uniform composition particles and the change in length of the samples after an autoclave test in hot water at 250° C. for 50 hours. Test results revealed that the zirconia porcelain according to the present invention is composed of a less porous sintered body containing from crystalline grains of tetragonal zirconia into which an appropriate amount of the stabilizer has been uniformly solidsolved. A zirconia porcelain having a very high thermal stability results when the zirconia porcelain: has a closed porosity of not more than 7%, preferably not more than 3%; crystal grains of the tetragonal zirconia are in a range of not more than 2 $\mu$m, preferably not more than 0.3 $\mu$m; and the amount of the tetragonal zirconia grains containing not more than 2% by weight of yttria is not more than 10% by volume, with respect to the whole crystal grains of the tetragonal zirconia crystals.

Methods for quantitatively measuring the degradation of ceramics containing tetragonal zirconia due to the transformation from the tetragonal system to the monoclinic system, include a method of measuring the transformation amount from the tetragonal system to the monoclinic system by a thermal expansion hysteresis measurement of an X-ray diffraction measurement, a method of measuring the strength, a method of measuring the change of the profile (i.e. shape), and so on. Among them, the measurement of the profile change, that is, a method of representing the degradation by the ratio of the difference between the length of the sample between, prior to and posterior to the test to the dimension prior to the test is the most convenient method having reliable results. It takes an extremely long time to measure the durability of ceramics containing tetragonal zirconia. However, degradation due to the transformation is vigorous at a specific temperature range around 250° C., and the degradation is accelerated when the content of water in the atmosphere is large. Consequently, the autoclave testing in hot water at 250° C. for 50 hours corresponds to exposure to air at 250° C. for about 5,000 hours. Thus, if the autoclave test is carried out in hot water at 250° C., accurate durability can be measured in a short amount of time (See Japanese Patent Application No. 107,645/1983 of the present inventors "Ceramic testing method" U.S. Pat. No. 4,559,824). Next, the reasons for the restriction according to the present invention will be described:

When the change in length of a sample after the autoclave test in hot water at 250° C. for 50 hours is not more than 0.05%, the reduction in strength is within 5% of the strength before the test, and the ceramic can withstand use at high temperatures for a long period of time, but only for applications which doe not require severe profile tolerances. However, when the zirconia ceramic is to be used in parts requiring severe tolerances, such as an engine cylinder liner, piston cap and so on it is required that the change in length of the ceramic be not more than 0.02%, even after use at high temperatures for a long period time. Therefore, the change in length of the ceramic cannot be more than 0.02% after the autoclave test in hot water at 250° C. for 50 hours. If the concentration of tetragonal zirconia in the ceramic body is less than 5% by volume, the effect of increasing the strength and the toughness through the admixture of zirconia is extremely small; while if the concentration is not less than 50% by volume, the characteristics peculiar to the zirconia, such as high strength, high toughness and so forth, preferably appear.

Yttria can stabilize zirconia at a relatively low temperature and only a small amount is preferred. If the concentration of the yttria is less than 2% by weight, the thermal stability is poor; while if it is over 10% by weight, the content of the tetragonal zirconia becomes lower and the strength drops. If the strength is less than 500 MPa, the zirconia porcelain is likely to be broken by external stress, thermal shock or the like and such a zirconia porcelain can not be used as a reliable structural material.

The zirconia porcelain according to the present invention may be produced, for instance, by the following method. That is, 2-10% by weight of yttria is added to zirconia powder having a specific surface area of from 5 to 25 m$^2$/g with the average particle size of the secondary particles being not more than 2 $\mu$m, preferably not more than 0.6 $\mu$m, to prepare a mixed powder. The mixed powder is preliminarily molded into a specific profile according to a hydrostatic pressurizing method, an extrusion molding method, a slurry casting method, etc. Then, the resulting molding is rubber pressed under pressure of from 100 to 2,000 kg/cm$^2$, and fired at a temperature of from 1,000° to 1,500° C., preferably from 1,250° C. to 1,450° C. At this time, in order to homogeneously and fully contact and mix the fine zirconia powder and the yttria powder to be readily reacted with each other, a mixing method in which a zirconia and yttria mixture is obtained by dispersing zirconia powder into a solution of a yttria compound; such as yttrium hydroxide, yttrium nitrate and the like, and thermally decomposing the yttrium compound is preferred. Further, it is preferable to add and mix from 0.5 to 1.0% by weight of a sintering aid such as clay, alumina, silica and so on into the mixture of zirconia and yttria to obtain a raw powder to be sintered so that the crystal grains of the tetragonal zirconia may be grown as small as possible, the sintering may be performed at low temperatures, the density may be high, and the yttria may be fully dispersed.

A method of measuring the content of tetragonal zirconia in the zirconia porcelain; a method of measuring the content of the stabilizer such as yttria in the tetragonal zirconia; a method of measuring the average particle size of the secondary particles of the zirconia powder; and a method of measuring the average particle size of the tetragonal zirconia in the sintered body, all according to the present invention are as follows:

The measurement of the content of the tetragonal zirconia in the zirconia porcelain is performed by using a wet chemical analysis method and an X-ray diffraction method. The content of the zirconium element is measured by the wet chemical analysis method to calculate the content of the zirconia in the zirconia porcelain. Then, by using, as a sample, a piece which is prepared by mirror polishing and surface finishing a pellet to a surface roughness of not more than 0.8 S specified in JIS (Japan Industrial Standard) B 0601, the content of tetragonal zirconia is measured by an X-ray diffraction crystal quantitative measuring method. Since the lattice constant of the tetragonal system is near to the cubic system of the zirconia, the peaks can not be separated from each other at a low angle diffraction because they are close to each other. Consequently, the ratio in amount between the monoclinic system and the tetragonal system plus the cubic system is measured based on the integrated intensity of the monoclinic peak and the integrated intensity of the tetragonal system plus the cubic system. The amount ratio between the tetragonal system and the cubic system is measured based on the integrated intensity of the peak of the tetragonal system and that of the cubic system at a high angle at which the peak of the tetragonal system is separated from that of the cubic system, so that the amounts of the respective crystals are calculated. Finally, the content of the tetragonal zirconia in the zirconia porcelain is determined through multiplying the calculated amount of the tetragonal zirconia by the content of the zirconia obtained in the wet chemical analysis. A specific calculation example of the content of the respective crystal systems of the zirconia according to the X-ray diffraction is as follows:

(1) Measurement of the integrated intensities:
Mixed integrated intensity of the tetragonal system (111) and the cubic system (111): $I_{T+C}(111)$
Integrated intensity of the monoclinic system $(11\bar{1})$ and (111): $I_M(11\bar{1}), I_M(111)$
Integrated intensity of the tetragonal system (004) and (400): $I_T(004), I_T(400)$
Integrated intensity of the cubic system (400): $I_C(400)$ (2) The content of the respective crystal systems are calculated according to the following equation:

monoclinic system (% by volume)

$$M = \frac{I_M(11\bar{1}) + I_M(111)}{I_M(11\bar{1}) + I_M(111) + I_{T+C}(111)} \times 100$$

tetragonal crystal system (% by volume)

$$T = (100 - M) \cdot \frac{I_T(004) + I_T(400)}{I_T(004) + I_T(400) + I_C(400)}$$

cubic crystal system (% by volume) $C = 100 - M - T$

For instance, when crystals containing an element in addition to zirconium, for example, zircon ($SiO_2 \cdot ZrO_2$) is present in the zirconia porcelain, a calibration curve of the X-ray diffraction of the crystals is separately prepared, and the content thereof can be quantitatively determined. The content of tetragonal zirconia in the zirconia porcelain may be corrected by using the thus determined content. The content of the stabilizer, such as yttria or the like, in the tetragonal zirconia is measured by using an analyzing electron microscope. More specifically, by using a thin piece of a thickness not greater than the size of the tetragonal grains in the zirconia porcelain as a sample, the weight % of the stabilizer in each one of the tetragonal grains is quantitatively determined based upon the intensity of the characteristic X-ray of zirconium and the stabilizer such as yttrium. In this case, a thin piece of a single crystal in a stabilized zirconia porcelain containing a known chemical analysis value of a stabilizer is used as a reference sample. Further, with respect to one sample, the contents and areas of yttria in one hundred tetragonal zirconia grains are measured, and the sum of the areas of the grains containing not more than 2% by weight of yttria and the area ratio thereof to the whole tetragonal zirconia grains are determined, so that the % by volume of the tetragonal zirconia grains having the content of not more than 2% by weight of yttria in the tetragonal zirconia, was determined. With respect to the grain size of the tetragonal zirconia, the average grain size was determined by dividing the sum of the areas of one hundred tetragonal zirconia grains determined in the above way by 100 and approximating the average thus obtained in a circle. The diameter of the secondary particles of the zirconia raw powder was measured according to a precipitation method based on JIS R 6002.

EXAMPLE 1

As a source of zirconia raw powder, use was made of a commercially available zirconia powder A having a BET specific surface area of 13 m²/g and the average secondary particle size of 0.6 μm with a good dispersibility, a toughly aggregated zirconia powder having a BET specific surface area of 8 m²/g and the average secondary particle size of 2 μm with poor dispersibility, and a zirconia powder C having a BET surface area of 15 m²/g and the average secondary particle size of 1.2 μm. Each type of zirconia powder was mixed with yttrium nitrate, which was calcined at 800° C. to prepare a mixture of zirconia and yttria. Further, clay was added to this mixture, which was wet mixed, crushed in a ball mill for 50 hours and then dried to prepare a raw powder. Apart from the above, a raw powder to which no sintering aid, such as clay, had been added was prepared.

Each of these powders was molded into a plane of 60 mm×60 mm×6 mm and a pellet of 20 mm in diameter×3 mm, and then sintered in an electric furnace at specific temperatures under application of a hydrostatic pressure of 1,000 kg/cm². By using a diamond cutter and a diamond grinder stone, a sample of 3 mm×4 mm×40 mm was prepared according to a bending strength measurement of fine ceramics specified in JIS-R-1601, and placed in an autoclave. Then, the sample was treated through exposure to hot water of 250° C. for 50 hours, and the changes in length and strength of the sample between, before, and after the treatment were measured.

Figure 2:
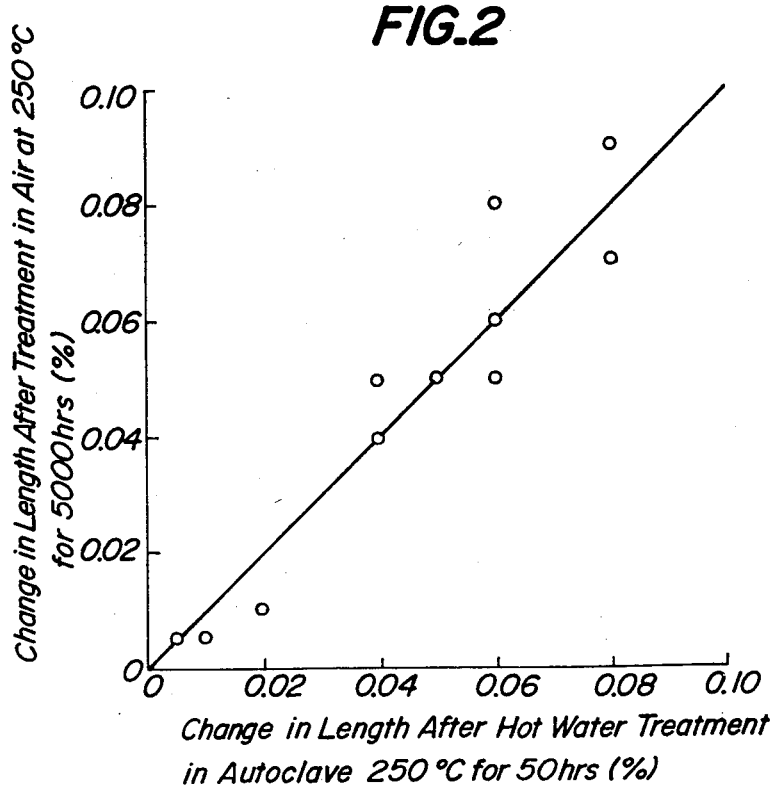

In addition, a durability test was carried out in air in an electric furnace at 250° C. for 5,000 hours, and changes in strength and length were measured. Results are shown in Table 1 and FIG. 2. With respect to all the samples, the change in length and the change in strength after the hot water treatment in the autoclave at 250° C. for 50 hours correlate with the data after the treatment in the atmosphere at 250° C. for 5,000 hours.

TABLE 1

| Sample No. | Zirconia raw material | Firing temperature (°C.) | Composition (weight %) | | Closed porosity (%) | Characteristics of fired body | | | Composition-ununiform particle* (% by volume) | After autoclave treatment in hot water (250° C., 50 hrs) | | After treatment in air (250° C., 5,000 hrs) | | Total evaluation |
|---|---|---|---|---|---|---|---|---|---|---|---|---|---|---|
| | | | | | | Tetragonal zirconia content (% by volume) | Tetragonal zirconia particle sizes (μm) | Strength (MPa) | | Length change (%) Δl₁ | Strength (MPa) | Length change (%) Δl₂ | Strength (MPa) | |
| 1 | Powder A Specific surface area 13 m²/g Secondary particle size 0.6 μm | 1,300 | ZrO₂ | 94.6 | 6.5 | 87 | 0.07 | 600 | 5 | 0.005 | 600 | 0.005 | 600 | good |
| 2 | | 1,400 | Y₂O₃ | 5.4 | 2.0 | 80 | 0.2 | 900 | 3 | 0.02 | 870 | 0.01 | 880 | good |
| 3 | | 1,600 | | | 3.0 | 65 | 2.2 | 800 | 3 | ** | — | ** | — | bad |
| 4 | Powder A Specific surface area 13 m²/g Secondary particle size 0.6 μm | 1,300 | ZrO₂ | 92.6 | 6.1 | 87 | 0.05 | 800 | 5 | 0.005 | 800 | 0.005 | 780 | good |
| 5 | | 1,400 | Y₂O₃ | 5.4 | 1.7 | 80 | 0.2 | 1,030 | 2 | 0.01 | 1,030 | 0.005 | 1,030 | excellent |
| 6 | | 1,600 | SiO₂ | 1.3 | 2.5 | 65 | 2.2 | 900 | 2 | 0.08 | 520 | 0.07 | 540 | bad |
| | | | Al₂O₃ | 0.7 | | | | | | | | | | |
| 7 | Powder B Specific surface area 8 m²/g Secondary particle size 2.0 μm | 1,300 | ZrO₂ | 92.6 | 8.2 | 86 | 0.1 | 560 | 18 | 0.06 | 480 | 0.05 | 460 | bad |
| 8 | | 1,400 | Y₂O₃ | 5.4 | 2.1 | 80 | 0.4 | 950 | 9 | 0.04 | 910 | 0.05 | 920 | good |
| 9 | | 1,600 | SiO₂ | 1.3 | 3.3 | 65 | 2.1 | 850 | 8 | ** | — | 0.08 | 450 | bad |
| | | | Al₂O₃ | 0.7 | | | | | | | | | | |
| 10 | Powder C Specific surface area 15 m²/g Secondary particle size 1.2 μm | 1,350 | ZrO₂ | 91.0 | 7.5 | 70 | 0.2 | 320 | 15 | 0.06 | 280 | 0.06 | 260 | bad |
| 11 | | 1,400 | Y₂O₃ | 7.0 | 2.5 | 60 | 0.3 | 650 | 8 | 0.04 | 620 | 0.04 | 630 | good |
| 12 | | 1,600 | SiO₂ | 1.3 | 3.0 | 50 | 3.2 | 450 | 6 | ** | — | ** | — | bad |
| | | | Al₂O₃ | 0.7 | | | | | | | | | | |
| 13 | Powder C Specific surface area 15 m²/g Secondary particle size 1.2 μm | 1,400 | ZrO₂ | 89.4 | 3.0 | 45 | 0.6 | 520 | 7 | 0.05 | 480 | 0.05 | 490 | good |
| | | | Y₂O₃ | 8.6 | | | | | | | | | | |
| | | | SiO₂ | 1.3 | | | | | | | | | | |
| | | | Al₂O₃ | 0.7 | | | | | | | | | | |
| 14 | Powder C | 1,700 | ZrO₂ | 87.0 | 2.5 | 4 | 26.0 | 350 | 1 | 0.06 | 200 | 0.08 | 170 | bad |

TABLE 1-continued

| Sample No. | Zirconia raw material | Firing temperature (°C.) | Composition (weight %) | | Closed porosity (%) | Characteristics of fired body | | | Composition-ununiform particle* (% by volume) | After autoclave treatment in hot water (250° C., 50 hrs) | | After treatment in air (250° C., 5,000 hrs) | | Total evaluation |
|---|---|---|---|---|---|---|---|---|---|---|---|---|---|---|
| | | | | | | Tetragonal zirconia content (% by volume) | Tetragonal zirconia particle sizes (μm) | Strength (MPa) | | Length change (%) Δl₁ | Strength (MPa) | Length change (%) Δl₂ | Strength (MPa) | |
| | Specific surface area 15 m²/g Secondary particle size 1.2 μm | | Y₂O₃ 11.0 SiO₂ 1.3 Al₂O₃ 0.7 | | | | | | | | | | | |
| 15 | Powder C Specific surface area 15 m²/g Secondary particle size 1.2 μm | 1,400 | ZrO₂ 96.5 Y₂O₃ 1.5 SiO₂ 1.3 Al₂O₃ 0.7 | | 3.0 | 80 | 1.2 | 500 | 11 | 0.08 | 380 | 0.09 | 380 | bad |

Note:
*Percentage of tetragonal zirconia grains containing not more than 2% by weight of Y₂O₃
**broken sample As compared with Sample Nos. 1-3 in which no clay was added, Sample Nos. 4-6 utilize zirconia powder A with good dispersibility having clay added and undergo less changes in length and smaller reduction in strength between before and after the autoclave test, there by resulting in a better product. Further, as compared with Sample Nos. 7-9 which utilize powder B having a poor dispersibility, the differences therebetween become more conspicuous. Sample Nos. 1, 2, 4, 5, 8, 11 and 13 each have a strength of not less than 500 MPa, and each of them has a reduction in strength of not more than 5% and a change in length of not more than 0.05% after the autoclave test or treatment in the atmosphere at 250° C. for 5,000 hours. Thus, they are excellent sintered bodies which do not easily undergo phrase transformation even under the conditions at which the tetragonal system typically transforms into the monoclinic system. According to each of these samples, the content of the yttria as the stabilizer is in a range of from 2 to 10% by weight, the closed porosity is not more than 7%, the content of tetragonal zirconia is not less than 5%, the particle size of the tetragonal zirconia is not more than 2 μm, and the rate for which the particles with the non-uniform composition having the concentration of yttria being not more than 2% by weight account is not more than 10% by volume. Among them, Sample Nos. 1, 2, 4, 5, 8 and 11 in which the content of the tetragonal zirconia is not less than 50% by volume have a strength of not less than 600 MPa after the treatment. Further, Sample Nos. 2 and 5 in which the change in length after the autoclave test is not more than 0.02% and the porosity is not more than 3% exhibit a minimal reduction in strength of not more than 3%. The particle size of the tetragonal zirconia in both Samples 2 and 5 is less than 0.3 μm. Thus, the zirconia porcelain in which the change in length between before and after the autoclave test is not more than 0.05% corresponds to a zirconia which does not suffer degradation even when in use for a long period of time under conditions which typically result in the tetragonal zirconia being transformed into monoclinic zirconia.

(EFFECTS OF THE INVENTION)

As obvious from the foregoing detailed explanation, according to the tetragonal zirconia porcelain of the invention, high durability ceramics which have high thermal stability and do not suffer, profile changes (i.e. shape changes), strength reduction, etc. even after a long period of use can be obtained.

That is, engine cylinder liners, piston caps, cylinder heads, valves, valve guides, exhaust ports, rocker arms, auxiliary combustion chambers, tappets, oxygen sensors, and so on as parts using the tetragonal zirconia containing zirconia porcelain according to the present invention which are subjected repeatedly to mechanical stresses such as thermal stresses, and thermal shock stresses, and oxygen sensor elements and the like using tetragonal zirconia-containing zirconia porcelain according to the present invention have a high durability and are reliable over extended periods of use even when exposed to environments which are acid or alkali.

What is claimed is:

1. A zirconia porcelain consisting essentially of:
    zirconia, wherein at least 5% by volume of the zirconia is tetragonal zirconia, and wherein the average particle size of the tetragonal zirconia is 2 μm or less; and
    2 to 10% by weight of yttria is added to the zirconia as a stabilizer thereof, said yttria being dispersed in the zirconia such that tetragonal zirconia grains which contain not more than 2% by weight of the yttria are not more than 10% by volume of all the tetragonal zirconia grains, the zirconia porcelain having a closed porosity of 7% or less, such that when the zirconia porcelain is exposed to water at a temperature of approximately 250° C. for a period of time of about 50 hours, the change in length of the zirconia porcelain is not more than 0.05%, said zirconia porcelain having a strength of not less than 500 MPa.

2. A zirconia porcelain according to claim 1, which contains not less than 50% by volume of tetragonal zirconia.

3. A zirconia porcelain according to claim 1, further comprising 1.3% by weight of $SiO_2$ and 0.7% by weight of $Al_2O_3$.

4. A zirconia porcelain according to claim 1, wherein said closed porosity is 3% or less.

5. A zirconia porcelain according to claim 1, wherein said average particle size of the tetragonal zirconia is less than 0.3 μm.

6. A zirconia porcelain comprising:
    at least 89.4% by weight of zirconia, said zirconia containing crystal grains of tetragonal zirconia in an amount not less than 45% by volume, wherein the tetragonal zirconia grains have an average particle size of 2 μm or less; and
    2 to 10% by weight of yttria is added to the zirconia as a stabilizer thereof, said yttria being dispersed in the zirconia such that tetragonal zirconia grains which contain not more than 2% by weight of the yttria are not more than 10% by volume of all the tetragonal zirconia grains, the zirconia porcelain having a closed porosity of 7% or less, such that when the zirconia porcelain is exposed to water at a temperature of approximately 250° C. for a period of time of about 50 hours, the change in length of the zirconia porcelain is not more than 0.05%, said zirconia porcelain having a strength of not less than 500 MPa.

7. A zirconia porcelain according to claim 6, wherein said volume % of tetragonal zirconia is not less than 80%.

8. A zirconia porcelain according to claim 6, further comprising 1.3% by weight of $SiO_2$ and 0.7% by weight of $Al_2O_3$.

9. A zirconia porcelain according to claim 6, wherein said closed porosity is 39% or less.

10. A zirconia porcelain according to claim 6, wherein said average particle size of the tetragonal zirconia is less than 0.3 μm.

11. A zirconia porcelain consisting essentially of:
    at least 89.4% by weight of zirconia, said zirconia containing crystal grains of tetragonal zirconia in an amount not less than 60% by volume, wherein the crystal grains of tetragonal zirconia have an average particle size of 2 μm or less;
    1.3% by weight of $SiO_2$;
    0.7% by weight of $Al_2O_3$; and
    2 to 10% by weight of yttria is added to the zirconia as a stabilizer thereof, said yttria being dispersed in the zirconia such that tetragonal zirconia grains which contain not more than 2% by weight of the yttria are not more than 10% by volume of all the tetragonal zirconia grains, the zirconia porcelain having a closed porosity of 3% or less, such that when the zirconia porcelain is exposed to water at a temperature of approximately 250° C. for a period of time of about 50 hours, the change in length of the zirconia porcelain is not more than 0.05%, said zirconia porcelain having a strength of not less than 500 MPa.

12. A zirconia porcelain according to claim 11, wherein said volume % of tetragonal zirconia is not less than 80%.

13. A zirconia porcelain according to claim 12, wherein said average particle size of the tetragonal zirconia is less than 0.3 μm.

* * * * *